United States Patent [19]

Boomgaard et al.

[11] 4,271,062
[45] Jun. 2, 1981

[54] PIGMENT-CONTAINING COATING COMPOSITION HAVING A HIGH SOLIDS CONTENT

[75] Inventors: Ritse E. Boomgaard, Oegstgeest; Roelof Buter, Dieren; Aleidus A. Kiffen, Angerlo, all of Netherlands

[73] Assignee: Akzo N.V., Arnhem, Netherlands

[21] Appl. No.: 140,574

[22] Filed: Apr. 15, 1980

[30] Foreign Application Priority Data

Apr. 19, 1979 [NL] Netherlands ................. 7903057

[51] Int. Cl.³ .................... C08K 3/12; C08L 67/08
[52] U.S. Cl. .................... 260/39 P; 428/458; 525/519; 525/443
[58] Field of Search ......... 525/519, 443; 260/39 P, 260/40 R

[56] References Cited

U.S. PATENT DOCUMENTS

| | | | |
|---|---|---|---|
| 3,857,817 | 12/1974 | Henshaw et al. | 260/67.6 R |
| 4,101,496 | 7/1978 | Dörffel et al. | 260/31.2 R |
| 4,104,240 | 8/1978 | Buter | 260/39 P |

*Primary Examiner*—Theodore E. Pertilla
*Attorney, Agent, or Firm*—Stevens, Davis, Miller & Mosher

[57] ABSTRACT

A pigment-containing high solids coating composition is prepared from a curing agent and and ester diol which is a mixture of (a) 20-80 mole % of a compound having the general formula:

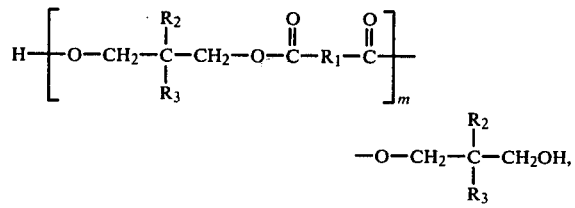

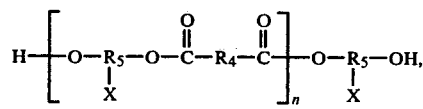

where $R_1$ represents the group formed by abstraction of the two carboxyl groups from maleic acid and/or fumaric acid and/or a cycloaliphatic and/or aromatic dicarboxylic acid having 8 to 20 carbon atoms and $R_2$ and $R_3$ may be the same or different and represent a hydrogen atom and/or a hydrocarbon group having 1 to 9 carbon atoms, and m is a number of 1-4, and of (b) 80-20 mole % of a compound having the general formula where $R_4$ represents the group formed by abstraction of the two carboxyl groups from maleic acid and/or fumaric acid and/or a cycloaliphatic and/or aromatic dicarboxylic acid having 8 to 20 carbon atoms, and $R_5$ represents the group formed by abstraction of 3 hydroxyl groups from a tri- or tetravalent hydroxy compound having 3 to 8 carbon atoms in the main chain, and X represents an aliphatic acyloxy group having 6-25 carbon atoms, and n is a number of 1-4.

9 Claims, No Drawings

PIGMENT-CONTAINING COATING COMPOSITION HAVING A HIGH SOLIDS CONTENT

Pigment-containing coating composition having a high solids content.

The invention relates to a pigment-containing high solids coating composition prepared from a blend of ester diols and a curing agent. A composition of this type prepared from one diester diol is known from U.S. Pat. No. 3,857,817; the dicarboxylic acid used for the preparation of the diester diol is either an aromatic dicarboxylic acid such as terephthalic acid, or an aliphatic dicarboxylic acid. It has been found that if such a composition does not contain a pigment, the resulting coating displays both sufficient hardness and sufficient flexibility. If, however, the composition does contain a pigment, which is mostly the case, then the coating is either insufficiently hard or insufficiently flexible. Further, U.S. Pat. No. 4,104,240 proposes the use of a pigment-containing coating composition based on a mixture of at least 2 ester diols which provides coatings that do have a high hardness and a high flexibility. The one ester diol must be built up then from a particular cycloaliphatic or aromatic dicarboxylic acid and the other ester diol from a particular aliphatic dicarboxylic acid and the other ester diol from a particular aliphatic dicarboxylic acid; the alcohol component of the ester diols is always an arbitrarily chosen divalent alcohol containing 2 to 12 carbon atoms. It has been found, however, that although after curing this known coating composition has favourable mechanical properties, its chemical resistance and durability still need to be improved, because it can as yet only be used mainly as a primer or a filler.

An object of the invention is to provide a coating composition of he above-described type which after curing has a very good chemical resistance and satisfactory durability, as well as a high hardness and a high flexibility. Consequently, the present coating composition is not only very suitable to be used as a primer or a filler, but also as a top coat. More particularly, the coating composition is suitable to be used as automobile paint.

The coating composition according to the invention is characterized in that as ester diol there is used a mixture of (a) 20–80 mole % of a compound having the general formula

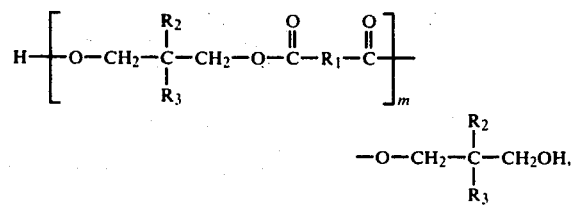

where $R_1$ represents the group formed by abstraction of the two carboxyl groups from maleic acid and/or fumaric acid and/or a cycloaliphatic and/or aromatic dicarboxylic acid having 8 to 20 carbon atoms and $R_2$ and $R_3$ may be the same or different and represent a hydrogen atom and/or a hydrocarbon group having 1 to 9 carbon atoms, and m is a number of 1–4, and of (b) 80–20 mole % of a compound having the general formula

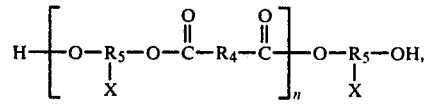

where $R_4$ represents the group formed by abstraction of the two carboxyl groups from maleic acid and/or fumaric acid and/or a cycloaliphatic and/or aromatic dicarboxylic acid having 8 to 20 carbon atoms, and $R_5$ represents the group formed by abstraction of 3 hydroxyl groups from a tri- or tetravalent hydroxy compound having 3 to 8 carbon atoms in the main chain, and X represents an aliphatic acyloxy group having 6–25 carbon atoms, and n is a number of 1–4.

By high solids coating compositions are to be understood here compositions having a solids content of at least 65% by weight and preferably at least 70% by weight. The solids content is determined in conformity with ASTM method D 1644-59 upon heating for 1 hour at 105° C.

The mixture of ester diols according to the invention comprises (a) an ester diol which may be formed from maleic acid and/or fumaric acid and/or one or more particular cycloaliphatic or aromatic dicarboxylic acids, an anhydride or an alkyl ester thereof, the alkyl group generally containing 1 to 4 carbon atoms, and from one or more particular propane diols.

Suitable cycloaliphatic or aromatic dicarboxylic acids or derivatives thereof include tetrahydrophthalic acid, tetrahydrophthalic anhydride, endomethylene tetrahydrophthalic acid, hexachloroendomethylene tetrahydrophthalic acid, hexahydrophthalic acid, hexahydroterephthalic acid, phthalic acid, p-carboxymethyl benzoic acid, dichlorophthalic acid, tetrachlorophthalic acid, dimethyl terephthalate, dimethylhexahydroterephthalate, naphthalene-2,6-dicarboxylic acid and biphenyl-o,o'-dicarboxylic acid. It is preferred that use should be made of one or more dicarboxylic acids having 8 to 10 carbon atoms, for example isophthalic acid and terephthalic acid. As examples of representative diols may be mentioned propane-1,3-diols having in the 2-position an alkyl group containing 1–4 carbon atoms, an aryl group, for instance a phenyl group, or a cycloaliphatic group, for instance a cyclohexyl group. As examples of suitable diols may be mentioned propane-1,3-diol, 2,2-dimethyl propane-1,3-diol, 2-methyl-2-n.propyl, propane-1,3-diol, 2-methyl-2-phenyl propane-1,3-diol, 2-ethyl-2n-butyl propane-1,3-diol, 2-propyl-2-n. butyl propane-1,3-diol, 2-methyl-2-cyclohexyl propane-1,3-diol, 2-methyl-2-tolyl propane-1,3diol, 2-methyl-2-p.isopropyl-phenyl propane-1,3-diol. It is preferred that use should be made of propane-1,3-diols which have in the 2-position at least one alkyl group containing 1 to 4 carbon atoms, more particularly 2,2-dimethyl propane-1,3-diol. The above-described ester diols will be referred to hereinafter as "branched propylene ester diol".

The mixture of ester diols according to the invention comprises (b) an ester diol which may be formed from maleic acid and/or fumaric acid and/or one or more cycloaliphatic and/or aromatic dicarboxylic acids, an anydride or an alkyl ester thereof, the alkyl group generally containing 1 to 4 carbon atoms, and from one or more diols or triols having 1 aliphatic acyloxy group containing 6 to 25 carbon atoms. The dicarboxylic acids or derivatives thereof to be used in the preparation of this type of ester diol may be the same as those used in the preparation of the branched propylene ester diol, but there is no absolute need for that.

As examples of suitable diols or triols may be mentioned the ester group-containing reaction products of 1 mole of a tri- or tetravalent alcohol and about 1 mole of a suitable fatty acid, and the glycidyl esters of fatty acids having 6 to 25 carbon atoms. As examples of suitable tri- or tetravalent alcohols used for this purpose may be mentioned glycerol, hexane-1,2,6-triol, trimethylol ethane, trimethylol propane, pentaerythritol and/or corresponding epoxy compounds, such as for instance epoxy propanol. A suitable glycidyl ester is, inter alia, the glycidyl ester of the synthetic 9 to 11 carbon atoms containing fatty acids known as Versatic Acid. Examples of other suitable fatty acids are 2-ethyl hexanoic acid, isononanoic acid, 1,1-dimethyl-1-heptane carboxylic acid, decanoic acid, dehydrated caster oil fatty acid, ricinoleic acid and acids like tall oil fatty acids consisting of e.g. 20–35% of oleic acid, 55–65% linoleic acid and 1–20% acids that contain 19–22 carbon atoms. Preferably, a fatty acid containing 8 to 12 carbon atoms should be used. The above-described ester diols will be referred to hereinafter as "fatty acid ester diol".

The number average molecular weight of the branched propylene ester diol and the fatty acid ester diol is generally in the range of 282 to 2000 and 564 to 2000, respectively, and preferably in the range of 310 to 1000 and 600 to 1200, respectively.

The ester diols to be used according to the invention may be prepared in any convenient manner. As a rule, one or more diols and/or glycidyl compounds may be brought into reaction with one or more dicarboxylic acids or, if desired, with an anhydride and/or an alkyl ester thereof, for instance in a molar ratio of the order of 1½–2:1. The esterification reaction takes place at elevated temperature, for instance at 115° to 250° C., in the presence, if desired, of one or more organic solvents, such as toluene or xylene. It is preferred that the reaction should be so carried out that the average number of ester groups per molecule of the prepared ester diol is in the range of 2 to 6 (m or n 1 to 3). The reaction will generally be carried out in the presence of an esterification catalyst of a usual concentration. The catalyst may be of the usual type and may for instance be an acid catalyst such as p-toluene sulphonic acid, a basic compound such as an amine or compounds such as zinc oxide, tetraisopropyl orthotitanate and triphenyl benzyl phosphonium chloride.

According to the invention the molar ratio of the branched propylene ester diol to the fatty acid ester diol is generally between 8:2 and 2:8, and preferably between 3:1 and 1:3, and more particularly between 2:1 and 1:2.

The ester diols may be intermixed in any convenient manner; for instance by first separately preparing the ester diols and subsequently intermixing them. Another suitable method consists in preparing one of the ester diols in the presence of the other ester diol or ester diols.

Depending on the method used for preparing the ester diols other esterification products may have formed in small amounts and be present in the ester diols according to the invention. Such additional esterification products usually are the higher molecular reaction products of the employed dicarboxylic acids and diols or derivatives of these compounds, for instance: esterification products having 9 to 12 ester groups. As a rule, the ester diols according to the invention contain not more than about 5% by weight and often less than 1% by weight of such higher molecular esterification products.

As curing agent for the mixture of ester diols according to the invention there may be used any curing agent suitable for curing a compound containing hydroxyl groups. Suitable curing agents generally include N-methylol groups- and/or N-methylol ether groups-containing amino resins obtained by reacting an aldehyde, such as formaldehyde, with a compound containing amino groups or amido groups, such as malamine, urea, N,N'-ethylene urea, dicyandiamide and benzoguanamine; for the preparation of such compounds, see Houben-Weyl, Methoden der organischen Chemie, Band 14/2, pp. 319–371 (1963). It is preferred that the aforedescribed compounds should entirely or partly be etherified with alcohols having 1 to 6 carbon atoms, for instance with methanol, ethanol, n-propanol, isopropanol, n-butanol, isobutanol, amyl alcohol, hexanol or mixtures of the alcohols referred to above. Particularly, use is made of a methylol melamine containing 4 to 6 methylol groups per molecule of melamine, at least 3 methylol groups being etherified with methanol, ethanol, propanol or with butanol, or a butanol-etherified condensation product of formaldehyde and N,N'-ethylene diurea. More particularly, use is made of a hexalkoxymethyl melamine with the alkoxy group containing 1 to 4 carbon atoms. Instead of or besides the above-described curing agents other suitable agents may be used, such as blocked or nonblocked polyisocyanates.

The curing agent is generally used in such an amount that the molar ratio of the hydroxyl groups of the ester diol mixture to the reactive groups of the curing agent is approximately between about 0.7 and 1.5 and preferably between 0.8 and 1.3.

The coating composition may further contain usual intermediate agents and additives, such as pigment dispersing agents, thixotropic agents or other means to influence the rheological properties, colourants, solvents and accelerators for the curing reaction, for instance acid compounds such as p-toluene sulphonic acid or blocked products thereof.

In any case the coating composition contains one or more pigments in a total amount of at least 10% by weight, and in general not more than 100% by weight, and preferably 15–35% by weight, calculated on the total ester diol content of the coating composition. Suitable pigments include the usual kinds, namely acid, neutral or basic pigments which may be of an organic or an inorganic nature. If desired, the pigments may have been pre-treated to modify the properties. As examples of suitable pigments may be mentioned titanium dioxide, iron oxide red, carbon black and phthalocyanin pigments. By pigments are also to be understood here metallic pigments such as those of aluminium and stainless steel. The coating composition ready for use generally has a viscosity not higher than 2 Pa.s, and preferably between 50 mPa.s and 1 Pa.s.

The coating composition may be applied to the substrate in any desirable way, for instance by roller coating, spraying, brushing, sprinkling, flow-coating, dipping or electrostatic spraying.

Further, the coating composition may be cured or baked in the usual manner, for instance at ambient temperature or at the usual temperatures between, say, 100° and 160° C., in a residence time of 20 to 60 minutes in a baking oven.

Preparation of ester diols.

EXAMPLE A

The following materials were charged into a reactor equipped with a stirrer, a thermometer and a condenser: 3900 grammes of 2,2-dimethyl propane-1,3-diol, 2700 grammes of phthalic anhydride and 1 gramme of tetraisopropyl orthotitanate. The mixture was heated to a temperature slightly above 170° C., upon which the water formed in the esterification reaction began to flow over. During the reaction 338 grammes of water were distilled off, the temperatures rising to 240° C. The ester prepared contained on an average 2.5 ester groups per molecule and will hereinafter be referred to as di(neopentyl glycol) phthalate.

EXAMPLE B

Into a reactor provided with a stirrer, a thermometer and a reflux condenser there were successively charged: 1250 grammes of the glycidyl ester of 1,1-dimethyl-1-heptane carboxylic acid (marketed by Shell under the trade name Cardura E) and 830 grammes of isophthalic acid. The mixture was heated to 150° C. After 30 minutes stirring another 1250 grammes of the glycidyl ester were added over a period of 30 minutes at a temperature of 150° C. Subsequently, the temperature was maintained at 150° C. for one more hour. The ester prepared contained on an average 4.05 ester groups per molecule and is referred to hereinafter as di(Cardura E) isophthalate.

EXAMPLE C

Into a reactor provided with a stirrer, a thermometer and a condenser there were successively charged: 3440 grammes of branched decanoic acid, 2680 g of 1,1,1-trimethylol propane, 1660 grammes of isophthalic acid and 1 gramme of tetraisopropyl orthotitanate. The mixture was heated to slightly above 170° C., upon which the water evolved in the esterification reaction began to flow over. During the reaction 720 grammes of water were distilled off, the temperature rising to 235° C. The ester diol prepared contained on an average 4:1 ester groups per molecule and is referred to hereinafter as di(trimethylol propane-decanoic acid)isophthalate.

EXAMPLE D

Into a reactor equipped with a stirrer, a thermometer and a condenser there were successively charged 1580 grammes of isonoanoic acid and 740 grammes, of 2,3-epoxypropanol-1 (glycidol). The mixture was heated to 160° C., after it was kept at a temperature of 160°-170° C. for 30 minutes. Subsequently, it was cooled to 130° C. and 1830 grammes of isophthalic acid and 0.5 grammes of tetraisopropyl orthotitanate were added. The mixture was heated to slightly above 170° C., upon which the water formed in the reaction was distilled off. The ester diol prepared had on an average 4 ester groups per molecule and is referred to hereinafter as di(glycidol-isononanoic acid)isophthalate.

EXAMPLE E

The procedure of Example A was repeated, with the exception that instead of the phthalic anhydride 2810 grammes of hexahydrophthalic anhydride were used. The ester diol prepared contained on an average 2.5 ester groups per molecule and is referred to hereinafter as di(neopentyl glycol) hexahydrophthalate.

EXAMPLE F

The procedure of Example A was repeated, with the exception that instead of the phthalic anhydride 1790 grammes of maleic anhydride were used. The ester diol prepared contained on an average 2.5 ester groups per molecule and is referred to hereinafter as di(neopentylglycol) maleinate.

EXAMPLE G

The procedure of Example A was repeated, with the exception that instead of the 2,2-dimethyl propane-1,3-diol 6864 grammes of 2-methyl-2-n-propyl propane-1,3-diol were used and instead of the phthalic anhydride 4316 grammes of isophthalic acid. The ester diol prepared contained on an average 2.5 ester groups per molecule and is referred to hereinafter as di(methylpropyl propane diol)isophthalate.

EXAMPLE H

The procedure of Example B was repeated, except that instead of isophthalic acid 580 grammes of maleic acid were used. The ester diol prepared contained on an average 4.2 ester groups per molecule and is referred to hereinafter as di(Cardura E)maleinate.

EXAMPLE K

The procedure of Example C was repeated, except that instead of the branched decanoic acid 2880 grammes of 2-ethyl hexanoic acid were used. The ester diol prepared contained on an average 4.1 ester groups per molecule and is referred to hereinafter as di(trimethylol propane-2-ethyl hexanoic acid)isophthalate.

EXAMPLE L

The procedure of Example C was repeated, except that instead of the branched decanoic acid 5960 grammes of ricinoleic acid were used. The ester diol prepared contained on an average 4.0 ester groups per molecule and is referred to hereinafter as di(trimethylol propanericinoleic acid)isophthalate.

In the following comparative examples and the other examples, which are not to be interpreted as limiting the scope of the present invention, the Persoz hardness is measured and expressed in seconds. The flexibility is determined with the aid of the "falling-wieght" tester (Erichsen—type 304) in accordance with ASTM D 2794-69, using a weight of 0.908 kg. measuring 15.9 mm in diameter and having a dropping opening of 16.3 mm, the value obtained being expressed in kg-cm. In accordance with this method the values were determined both for the coated side and the back of the phosphatized steel test panel (Bonder 120). Moreover, the conical mandrel test was carried out, its results being expressed in mm.

An acceptable minimum value of the hardness is about 200 seconds. An acceptable minimum value of the flexibility is of the order of 35 kg-cm. the highest value to be measured being 85 kg-cm. The conical mandrel test (carried out in accordance with ASTM D 522-41) gives a value below the lower measuring value 1 in the case of very flexible coatings; a value of 104 in this test is indicative of the coating being very brittle. The gloss was determined at 60° and at 20° (ASTM D-523). A gloss value above 90 at 60° is considered very high. A gloss value above 80 at 20° is also regarded as high. The values of the measured properties are listed in Table 1.

The chemical resistance is determined by the Kesternich test in accordance with DIN 50018 (with 2 l SO₂), the degree of surface attack by SO₂ being indicated. A high value is indicative of high chemical resistance, a low value of low chemical resistance. The scale range is of from 0 to 10. The durability is determined by the usual Weather-O-Meter test (WOM-test), using a carbon arc and a cycle 17/3.

The evaluation is carried out by determining the gloss at 60° after a period of 500 hours. A value of 80 is very good; a value of about 40 is unacceptable. Finally, the gloss retention is measured at 60° after 1 year exposure in Florida with the coated object facing south while positioned at an angle of 5° to the horizontal. The gloss retention is indicated as the ratio of the gloss value after exposure to the original gloss value (expressed as percentage). The measured values are given in Table 2.

The sprayable compositions described in the comparative examples and in the other examples all have a viscosity of 25 seconds at 20° C. (Ford cup No. 4). The resulting coating (after baking) had the thickness given in Table 1.

EXAMPLES

COMPARATIVE EXAMPLE 1

The following components were homogeneously mixed:

| | |
|---|---|
| di(neopentyl glycol)phthalate (prepared in accordance with Example A) | 260 g |
| hexamethoxymethyl melamine | 130 g |
| a 20% solution of p-toluene sulphonic acid in isopropanol | 10 g |
| titanium dioxide | 282 g |
| a mixture of equal parts by weight of xylene and ethyl glycol acetate | 133 g |

The resulting pigmented coating composition was applied to a steel panel treated with zinc phosphate (Bonder 120) and cured for 30 minutes at a temperature of 130° C. The coating obtained had a good hardness, but was very brittle (see also Table 1).

COMPARATIVE EXAMPLE 2

Using the same procedure as in Comparative Example 1 a pigmented coating composition based on the ester diol of Example C was tested. The coating composition was made up as follows:

| | |
|---|---|
| tetra(trimethylol propane)isophthalate | 300 g |
| hexamethoxymethyl melamine | 90 g |
| a 20%-solution of p-toluene sulphonic acid in isopropanol | 10 g |
| titanium dioxide | 282 g |
| a mixture of equal parts by weight of xylene and ethylglycol acetate | 120 g |

It was found that the baked pigmented coating composition had a high flexibility, but insufficient hardness (see also Table 1).

COMPARATIVE EXAMPLE 3

Into a reactor equipped with a stirrer, a thermometer and a condenser there were successively charged 880 grammes of branched decanoic acid, 680 grammes of 1,1,1-trimethylol propane, 520 grammes of phthalic anhydride, 720 grammes of isophthalic acid, 1120 grammes of 2,2-dimethyl propane-1,3-diol and 0.5 grammes of tetraisopropyl orthotitanate.

The mixture was heated to a temperature of 170° C., upon which the water formed in the reaction began to flow over. During the reaction 378 grammes of water were distilled off, the temperature rising to 240° C. The ester prepared contained on an average 3.1 ester groups per molecule.

A coating composition of the above-described ester diol was tested, using the same procedure as in Comparative Example 2. The coating composition was made up as follows:

| | |
|---|---|
| ester diol | 280 g |
| hexamethoxymethyl melamine | 110 g |
| a 20%-solution of p-toluene sulphonic acid in isopropanol | 10 g |
| titanium dioxide | 282 g |
| a mixture of equal parts by weight of xylene and ethylglycol acetate | 127 g |

The baked coating composition had a good hardness, but a low flexibility (see also Table 1).

COMPARATIVE EXAMPLE 4

Into a reactor provided with a stirrer, a thermometer, a reflux condenser and a dropping funnel there were charged 1661 grams of isophthalic acid. The reactor was subsequently heated to 150° C., after which a mixture of 1276 grams of propylene oxide and 3 grams of triphenyl benzyl phosphonium chloride were added so slowly that a steady reflux at 150° C. was maintained. After the entire mixture had been added, the temperature was for one more hour kept at 150° C. After completion of the reaction the small excess of propylene oxide was removed in vacuo. The ester diol prepared had on an average 2.4 ester groups per molecule and is hereinafter referred to as di(propane-1,2-diol)isophthalate.

In the preparation of an ester diol that will hereinafter be referred to as di(propane-1,2-diol)adipate, the following materials were charged into a reactor equipped with a stirrer, a thermometer and a condenser: 1461 grams of adipic acid, 3044 grams of propane-1,2-diol, 4 grams of zinc oxide. The mixture was heated to a temperature slightly above 150° C., upon which the water formed in the esterification reaction began to flow over. During the reaction 360 grams of water were distilled off, the temperatur rising to 180° C. After the temperature had subsequently been decreased to 90° C., the excess of propane-1,2-diol (1522 grams) was distilled off in vacuo. The ester diol prepared contained on an average 2.5 ester groups per molecule.

The following components were homogeneously mixed:

| | |
|---|---|
| di(propane-1,2-diol)isophthalate | 98 g |
| di(propane-1,2-diol)adipate | 138 g |
| hexamethoxymethyl melamine | 114 g |
| a 20% solution of p-toluene sulphonic acid in isopropanol | 9 g |
| titanium dioxide | 240 g |
| a mixture of equal parts by weight of xylene and ethylglycol acetate | 90 g |

The baked coating composition had both a good hardness and a good flexibility, but unacceptable chemical resistance and durability (see the Tables 1 and 2).

EXAMPLE I

The following components were homogeneously mixed:

| | |
|---|---|
| di(neopentyl glycol)phthalate | 140 g |
| (prepared in accordance with Example A). | |
| di(trimethylol propane-decanoic acid) isophthalate | 140 g |
| (prepared in accordance with Example C). | |
| hexamethoxymethyl melamine | 110 g |
| a 20%-solution of p-toluene sulphonic acid in isopropanol | 10 g |
| titanium dioxide | 282 g |
| a mixture of equal parts by weight of xylene and ethylglycol acetate | 130 g |

The sprayable composition was applied and tested in the same way as in Comparative Example 1. Unlike the coating composition obtained in Comparative Example 3 the baked coating had good mechanical and other properties (see the Tables 1 and 2).

EXAMPLE II

The following components were homogeneously mixed:

| | |
|---|---|
| di(neopentyl glycol)phthalate | 140 g |
| (prepared in accordance with Example A) | |
| di(Cardura E) isophthalate | 140 g |
| (prepared in accordance with Example B) | |
| hexamethoxymethyl melamine | 110 g |
| a 20%-solution of p-toluene sulphonic acid in isopropanol | 10 g |
| titanium dioxide | 282 g |
| a mixture of equal parts by weight of xylene and ethylglycol acetate | 115 g |

The coating composition was applied and tested in the same way as in Example I. The baked coating was good mechanical and other properties (see the Tables 1 and 2).

EXAMPLE III

The following components were homogeneously mixed:

| | |
|---|---|
| di(neopentyl glycol)hexahydrophthalate | 115 g |
| (prepared in accordance with Example E) | |
| di(glycidol-isononanoic acid)isophthalate | 175 g |
| (prepared in accordance with Example D) | |
| hexamethoxymethyl melamine | 100 g |
| a 20%-solution of p-toluene sulphonic acid in isopropanol | 10 g |
| titanium dioxide | 282 g |
| a mixture of equal parts by weight of xylene and ethylglycol acetate | 122 g |

The coating composition was applied and tested in the same way as in Example I. The baked coating had good mechanical and other properties (see the Tables 1 and 2).

EXAMPLE IV

The following components were homogeneously mixed:

| | |
|---|---|
| di(methylpropyl propane diol)isophthalate | 178 g |
| (prepared in accordance with Example G) | |
| di(Cardura E)isophthalate | 112 g |
| (prepared in accordance with Example B) | |
| hexamethoxymethyl melamine | 120 g |
| a 20%-solution of p-toluene sulphonic acid in isopropanol | 10 g |
| titanium dioxide | 282 g |
| a mixture of equal parts by weight of xylene and ethylglycol acetate | 126 g |

The coating composition was applied and tested in the same way as in Example I. The baked coating had good mechanical and other properties (see the Tables 1 and 2).

EXAMPLE V

The following components were homogeneously mixed:

| | |
|---|---|
| di(neopentyl glycol)maleinate | 75 g |
| (prepared in accordance with Example F) | |
| di(Cardura E) maleinate | 195 g |
| (prepared in accordance with Example H) | |
| hexamethoxymethyl melamine | 120 g |
| a 20%-solution of p-toluene sulphonic acid in isopropanol | 10 g |
| titanium dioxide | 282 g |
| a mixture of equal parts by weight of xylene and ethylglycol acetate | 116 g |

The coating composition was applied and tested in the same way as in Example I. The baked coating compositions had good mechanical and other properties (see the Tables 1 and 2).

EXAMPLE VI

The following components were homogeneously mixed:

| | |
|---|---|
| di(neopentyl glycol)phthalate | 140 g |
| (prepared in accordance with Example A) | |
| di(trimethylol propane-2-ethyl hexanoic acid)-isophthalate | 140 g |
| (prepared in accordance with Example K) | |
| hexamethoxymethyl melamine | 110 g |
| a 20%-solution of p-toluene sulphonic acid in isopropanol | 10 g |
| titanium dioxide | 282 g |
| a mixture of equal parts by weight of xylene and ethylglycol acetate | 132 g |

The coating composition was applied and tested in the same way as in Example I. The baked coating composition had good mechanical and other properties (see the Tables 1 and 2).

EXAMPLE VII

The following components were homogeneously mixed:

| | |
|---|---|
| di(neopentyl glycol)phthalate | 180 g |
| (prepared in accordance with Example A) | |
| di(trimethylol propane-ricinoleic acid)isophthalate | 120 g |
| (prepared in accordance with Example L) | |
| hexamethoxymethyl melamine | 100 g |
| a 20%-solution of p-toluene sulphonic acid in ispropanol | 10 g |
| titanium dioxide | 282 g |
| a mixture of equal parts by weight of xylene and ethylglycol acetate | 125 g |

The coating composition was applied and tested in the same way as in Example I. The baked coating composition had good mechanical and other properties (see the Tables 1 and 2).

TABLE 1

| | Coating thickness (μm) | Persoz hardness (sec.) | Falling-weight test (kg-cm) coating side | Falling-weight test (kg-cm) back | Conical mandrel test (mm) | Gloss 60° | Gloss 20° |
|---|---|---|---|---|---|---|---|
| Comparative example | | | | | | | |
| 1 | 36 | 360 | 12 | 2 | >104 | 100 | 93 |
| 2 | 37 | 100 | >85 | >85 | <1 | 100 | 94 |
| 3 | 40 | 295 | 18 | 2 | <1 | 97 | 92 |
| Example | | | | | | | |
| I | 35 | 295 | 70 | 30 | <1 | 96 | 94 |
| II | 37 | 287 | 63 | 25 | <1 | 97 | 93 |
| III | 40 | 292 | 68 | 28 | <1 | 98 | 93 |
| IV | 36 | 298 | 62 | 25 | <1 | 96 | 92 |
| V | 37 | 293 | 60 | 24 | <1 | 96 | 93 |
| VI | 40 | 290 | 66 | 28 | <1 | 96 | 93 |
| VII | 40 | 260 | 40 | 10 | <1 | 96 | 92 |

TABLE 2

| | Kesternich test | WOM-test | Gloss retention |
|---|---|---|---|
| Comparative Example 4 | 2 | 43 | 65 |
| Example | | | |
| I | 9 | 81 | 92 |
| II | 10 | 79 | 96 |
| III | 8 | 80 | 90 |
| IV | 10 | 81 | 94 |
| V | 8 | — | — |
| VI | 9 | 82 | 92 |
| VII | 9 | 80 | 89 |

What is claimed is:

1. A pigment-containing high solids coating composition prepared from a blend of ester diols as binder and a curing agent for the binder, characterized in that an ester diol there is used a mixture of (a) 20–80 mole % of a compound having the general formula:

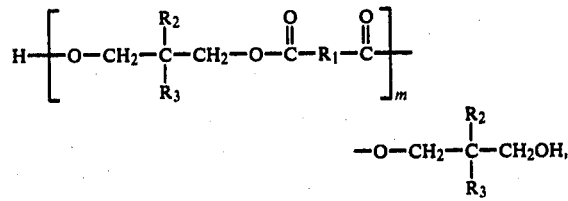

$$-O-CH_2-\underset{R_3}{\overset{R_2}{\underset{|}{C}}}-CH_2OH,$$

where $R_1$ represents the group formed by abstraction of the two carboxyl groups from maleic acid and/or fumaric acid and/or a cycloaliphatic and/or aromatic dicarboxylic acid having 8 to 20 carbon atoms and $R_2$ and $R_3$ may be the same or different and represent a hydrogen atom and/or a hydrocarbon group having 1 to 9 carbon atoms, and m is a number of 1–4, and of (b) 80–20 mole % of a compound having the general formula

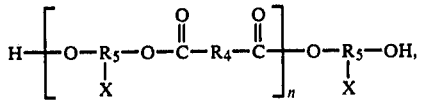

where $R_4$ represents the group formed by abstraction of the two carboxyl groups from maleic acid and/or fumaric acid and/or a cycloaliphatic and/or aromatic dicarboxylic acid having 8 to 20 carbon atoms, and $R_5$ represents the group formed by abstraction of 3 hydroxyl groups from a tri- or tetravalent hydroxy compound having 3 to 8 carbon atoms in the main chain, and X represents an aliphatic acyloxy group having 6–25 carbon atoms, and n is a number of 1–4.

2. The coating composition of claim 1 characterized in that the molar ratio of the ester diols is between 3:1 and 1:3.

3. The coating composition of claim 1 characterized in that the molar ratio of the ester diol is between 2:1 and 1:2.

4. The coating composition of to claim 1 characterized in that one of the ester diols is built up from a cycloaliphatic and/or aromatic dicarboxylic acid containing 8 to 10 carbon atoms and 2,2-dimethyl propane-1,3-diol.

5. The coating composition of claim 1 characterized in that X in the formula of ester diol (b) represents an aliphatic acyloxy group having 8 to 12 carbon atoms.

6. The coating composition of claim 1 characterized in that the molar ratio of the hydroxyl groups of the ester diol mixture to the reactive groups of the curing agent is approximately between 0.7 and 1.5.

7. The coating composition of claim 1 characterized in that the amount of pigment in the coating composition is at least 10% by weight, based on the total amount of ester diol.

8. The coating composition of claim 1 wherein said curing agent for the binder is a methylol melamine containing 4 to 6 methylol groups per molecule of melamine, at least 3 of said methylol groups being etherified with an alcohol selected from the group consisting of methanol, ethanol, and butanol.

9. The coating composition of claim 1 wherein said curing agent for the binder is an N-methylol group- and/or N-methylol ether group-containing amino resin formed by reacting an aldehyde with a compound containing amino groups or amido groups.

* * * * *